United States Patent
Hipke

(12) 
(10) Patent No.: US 11,110,529 B2
(45) Date of Patent: Sep. 7, 2021

(54) METHOD FOR GEAR MANUFACTURING MACHINING OF A WORKPIECE

(71) Applicant: Liebherr-Verzahntechnik GmbH, Kempten/Allgäu (DE)

(72) Inventor: Martin Hipke, Waltenhofen (DE)

(73) Assignee: LIEBHERR-VERZAHNTECHNIK GMBH, Kempten/Allgäu (DE)

(*) Notice: Subject to any disclaimer, the term of this patent is extended or adjusted under 35 U.S.C. 154(b) by 0 days.

(21) Appl. No.: 16/563,752

(22) Filed: Sep. 6, 2019

(65) Prior Publication Data

US 2020/0078879 A1 Mar. 12, 2020

(30) Foreign Application Priority Data

Sep. 6, 2018 (DE) .................. 10 2018 121 788.9

(51) Int. Cl.
 *B23F 5/16* (2006.01)
 *B23F 17/00* (2006.01)
 *B23F 23/08* (2006.01)

(52) U.S. Cl.
 CPC ............ *B23F 5/163* (2013.01); *B23F 17/006* (2013.01); *B23F 23/085* (2013.01)

(58) Field of Classification Search
 CPC ....... B23F 5/163; B23F 17/006; B23F 23/085
 See application file for complete search history.

(56) References Cited

U.S. PATENT DOCUMENTS

2016/0158860 A1* 6/2016 Prock ................. G05B 19/186
 409/37

FOREIGN PATENT DOCUMENTS

| CN | 106271874 A | 1/2017 |
|---|---|---|
| DE | 934136 C | 10/1955 |
| DE | 102012012617 A1 | 12/2013 |
| DE | 102012016515 A1 | 2/2014 |
| DE | 102013109981 A1 | 1/2015 |

* cited by examiner

*Primary Examiner* — Alan Snyder
(74) *Attorney, Agent, or Firm* — McCoy Russell LLP

(57) ABSTRACT

The present disclosure discloses a method for chip-removing gear manufacturing machining of a workpiece by means of a tool, where a rotation of the tool takes place in generating coupling with a rotation of the workpiece, in particular gear manufacturing machining of a workpiece by skiving, wherein the gear manufacturing machining is carried out in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece. According to the present disclosure, the same rotational angle may be used for a plurality of machining steps taking place closer to a second flank.

21 Claims, 6 Drawing Sheets

PRIOR ART

PRIOR ART

METHOD FOR GEAR MANUFACTURING MACHINING OF A WORKPIECE

CROSS REFERENCE TO RELATED APPLICATION

The present application claims priority to German Application No. DE 10 2018 121 788.9 entitled "VERFAHREN ZUR VERZAHNBEARBEITUNG EINES WERKSTÜCKS", filed on Sep. 6, 2018. The entire contents of the above listed application are hereby incorporated by reference for all purposes.

TECHNICAL FIELD

The present disclosure relates to a method for chip-removing gear manufacturing machining of a workpiece with a tool, where a rotation of the tool and a rotation of the workpiece take place in generating coupling, in particular gear manufacturing machining of a workpiece by skiving.

In the case of such a method, gear manufacturing machining usually takes place in several machining steps S1, S2, . . . , the center distance being changed between two machining steps, so that the total material removal required to generate the desired target toothing of the workpiece is distributed over several steps.

BACKGROUND AND SUMMARY

Reference DE 10 2012 012 617 A1 discloses that the generating machining motion has superimposed thereon an auxiliary motion, through which the flank cuts generated in at least two immediately successive machining steps are connected to each other. As can be seen in FIG. 1, the generating coupling has, for this purpose, superimposed thereon a fixed rotational angle for each machining step such that the contours produced in the individual machining steps S1, S2 . . . follow the incoming left flank of the target toothing. This prevents the generation of U-shaped chips, which tend to jam between the tool and the workpiece. The method, however, is disadvantageous insofar as the tool wears out very unevenly.

From DE 10 2013 109 981 A1 a method is known, in which, although the absolute value of the rotational angle still decreases step by step, as shown in FIG. 2, the sign of the rotational angle changes after a group of machining steps S1, S2, . . . and preferably after each machining step, so that the left and right tooth flanks are machined alternately. This leads to a symmetrical load and thus wear of the tool.

It is the object of the present disclosure to improve the methods known from the prior art still further.

This object is achieved by the methods disclosed herein.

Embodiments of the present disclosure are further disclosed herein.

The present disclosure comprises, in a first aspect, a method for chip-removing gear manufacturing machining of a workpiece by means of a tool, where a rotation of the tool takes place in generating coupling with a rotation of the workpiece, in particular gear manufacturing machining of a workpiece by skiving, wherein the gear manufacturing machining is carried out in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece. The first aspect is characterized in that the same rotational angle is used for a plurality of machining steps taking place closer to a second flank.

The inventor of the present application realized that through the step-by-step decreasing rotational angle according to DE 10 2013 109 981 A1, as a result of which a first cutting edge section of the cutting tooth of the tool acts on both flanks of the toothing with an at least reduced chip removal, seen in comparison with other cutting edge sections of this cutting tooth, the efficiency of the gear manufacturing machining is substantially reduced.

However, using, according to the present disclosure, the same rotational angle for machining at least one flank allows to accomplish a higher efficiency of gear manufacturing machining, in particular since the chip removal per machining step can be increased. Due to the fact that, in addition, a contour extending closer to a first and a second flank of the target toothing of the workpiece is alternately cut, the load on both flanks of the tool will still be comparatively uniform.

In at least one example, the same rotational angle is used for at least three machining steps and/or for all the machining steps taking place closer to a second flank.

According to a second aspect, the present disclosure comprises a method for chip-removing gear manufacturing machining of a workpiece by means of a tool, where a rotation of the tool takes place in generating coupling with a rotation of the workpiece, in particular gear manufacturing machining of a workpiece by skiving, wherein the gear manufacturing machining is carried out in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece. The second aspect is characterized in that for a plurality of machining steps, which take place closer to a second flank, the tool machines the workpiece in a chip-removing manner over the entire tooth height that has already been generated.

The second aspect is based on the same finding that has already been described in detail above with respect to the first aspect. In particular, the chip removal per machining step will be increased by the fact that at least one flank is machined over the entire tooth height that has already been generated. Due to the fact that, in addition, a contour extending closer to a first and a second flank of the target toothing of the workpiece is alternately cut, the load on both flanks of the tool will still be comparatively uniform.

In at least one example, for at least three machining steps and/or for all the machining steps taking place closer to a second flank, the workpiece will be machined in a chip-removing manner over the entire tooth height that has already been generated.

In at least one example, during machining of the workpiece over the entire tooth height that has already been generated, the second flank is machined by removing chips of non-varying thickness at least over the main part of the tooth height that has already been generated, in particular over an extent of more than 75% of the tooth height and in at least one example over an extent of 90% of the tooth height.

Alternatively or additionally, during machining of the workpiece over the entire tooth height that has already been generated, chips are removed from the second flank, which have a minimum thickness in a direction normal to the flank of at least 10% of the maximum thickness of the chips removed in a radial direction and/or of the change of the center feed between the machining step carried out at the moment in question and the last machining step that has taken place closer to the second flank. In at least one example, the minimum thickness of the chips removed amounts in a direction normal to the flank to at least 20% of the maximum thickness of the chips removed in a radial direction and/or of the change of the center feed between the machining step carried out at the moment in question and the preceding machining step that has taken place closer to the second flank.

The first and the second aspect are, in principle, independent of each other. However, the two aspects are used in combination in at least one example.

Example embodiments, which further develop both the first and the second aspect separately as well as a combination of the first and second aspects, will be described in more detail hereinafter.

According to at least one embodiment of the present disclosure, the second flank is the outgoing flank of the toothing. Since chips are transported outwards away from the toothing on the outgoing side of the toothing, the long chips produced according to the present disclosure on this flank are less problematic than on the incoming flank.

According to a possible embodiment of the present disclosure a rotational angle of zero is used for the plurality of machining steps taking place closer to the second tooth flank. Hence, each second machining step is generated with a tool tooth arranged symmetrically with the desired tooth gap of the workpiece.

According to a first possible embodiment of the present disclosure, the rotational angle is reduced step by step, for a plurality of machining steps taking place closer to a first tooth flank, in such a way that the flank cuts generated on this tooth flank are connected to one another and/or follow the contour of the target toothing of the workpiece, and/or the tool machines the workpiece in a chip-removing manner on this tooth flank only over a lower part of the tooth height that has already been generated. Hence, the chips generated on the first flank are comparatively short, whereby the risk of jamming of the chips is reduced.

In at least one example, the first tooth flank is the incoming tooth flank. On this flank, long chips are more problematic, since they are drawn into the tooth gap, so that the generation of short chips is here of particular advantage.

A certain asymmetry in the load on the tool is accepted in the case of this first embodiment in order to obtain shorter chips on the first side.

According to a second possible embodiment of the present disclosure, the same rotational angle is used for a plurality of machining steps which take place closer to a first tooth flank, and/or the tool machines the workpiece, in a chip-removing manner, in a plurality of machining steps on the side of the incoming flank as well as on the side of the outgoing flank over the entire tooth height.

It is true that, as a result, long chips are generated on both flanks, but a symmetrical load on the tool is obtained.

According to a further development of the second embodiment, the absolute value of the rotational angle is selected to be the same for a plurality of machining steps and the sign of the rotational angle changes depending on whether the cut generated runs closer to a first or a second tooth flank.

According to a possible embodiment of the present disclosure, the axial feed and/or the cutting speed and/or the change of the center feed between two machining steps is varied for at least two machining steps. The method according to the present disclosure thus allows an optimization of the process.

In at least one example, the axial feed and/or the center feed and/or the cutting speed selected for a machining step taking place closer to the second flank may exceed that/ exceed those selected for a preceding and/or subsequent machining step taking place closer to the first flank. In particular, the first flank is here the incoming flank and the second flank the outgoing flank.

Due to the less advantageous chip discharge conditions, the incoming flank is subjected to a higher cutting edge load. After material is first removed from the incoming flank in a preceding machining step, the cutting conditions in the subsequent machining step, in which less material is cut with the cutting edge for the incoming flank, can be much higher, by using a larger axial feed, a larger center feed and/or a higher cutting speed. This means that two successive machining steps can be executed with similar cutting edge loads, which will then, altogether, lead to shorter machining times while the tool life will approximately remain the same.

Normally, the tool will be forwarded for reworking when it has reached a certain condition of wear. With the design that has been used up to now, this wear is usually only reached at the cutting edge for the incoming flank. Due to the changed process design, the cutting edge for the outgoing flank is now subjected to higher loads, but this does not mean that the tool has to be reworked earlier. On the contrary, the outgoing tool edge is also subjected to higher wear due to the higher load, but remains still below the admissible wear mark width.

The present disclosure additionally comprises a gear manufacturing machine, comprising
  a tool holder rotatable about a rotary axis,
  a workpiece holder rotatable about a rotary axis,
  at least one further motion axis by means of which a center distance between the tool holder and the workpiece holder can be adjusted, and
  a control unit for controlling the rotary axes and/or the motion axis,
wherein the control unit comprises a generating machining program, by means of which a tool held in the tool holder machines, in a chip-removing manner, a workpiece held in the workpiece holder, in generating coupling therewith, in particular by skiving. The generating machining program carries out the gear manufacturing machining in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece. According to the first aspect of the present disclosure, the generating machining program uses the same rotational angle for a plurality of machining steps taking place closer to a second flank. According to the second aspect, which may also be combined with the first aspect, the generating machining program changes between two machining steps the center distance and/or the rotational angle between the workpiece and the tool superimposed on the generating coupling, such that the tool will machine the workpiece in a chip-removing manner for a plurality of machining steps, which take place closer to a second flank, over the entire tooth height that has already been generated.

The generating machining program is a skiving program for subjecting the workpiece to skiving, in at least one example.

In at least one example, the gear manufacturing machine is configured such that the generating machining program implements a method for gear manufacturing machining of the type described in detail hereinbefore. In at least one example, the generating machining program is programmed for automatically controlling the rotary axes and/or the motion axes for executing the method.

The rotary axes and/or the motion axes of the gear manufacturing machine may be NC-controlled.

The present disclosure additionally comprises a software for a gear manufacturing machine with a generating machining program, which implements a method for gear manufacturing machining of the type described hereinbefore. Such a software can be installed on a gear manufacturing machine, so as to be able to carry out a method according to the present disclosure on the gear manufacturing machine.

BRIEF DESCRIPTION OF THE FIGURES

The present disclosure will now be described in more detail making reference to figures and embodiments, in which.

DETAILED DESCRIPTION

Figure 1:
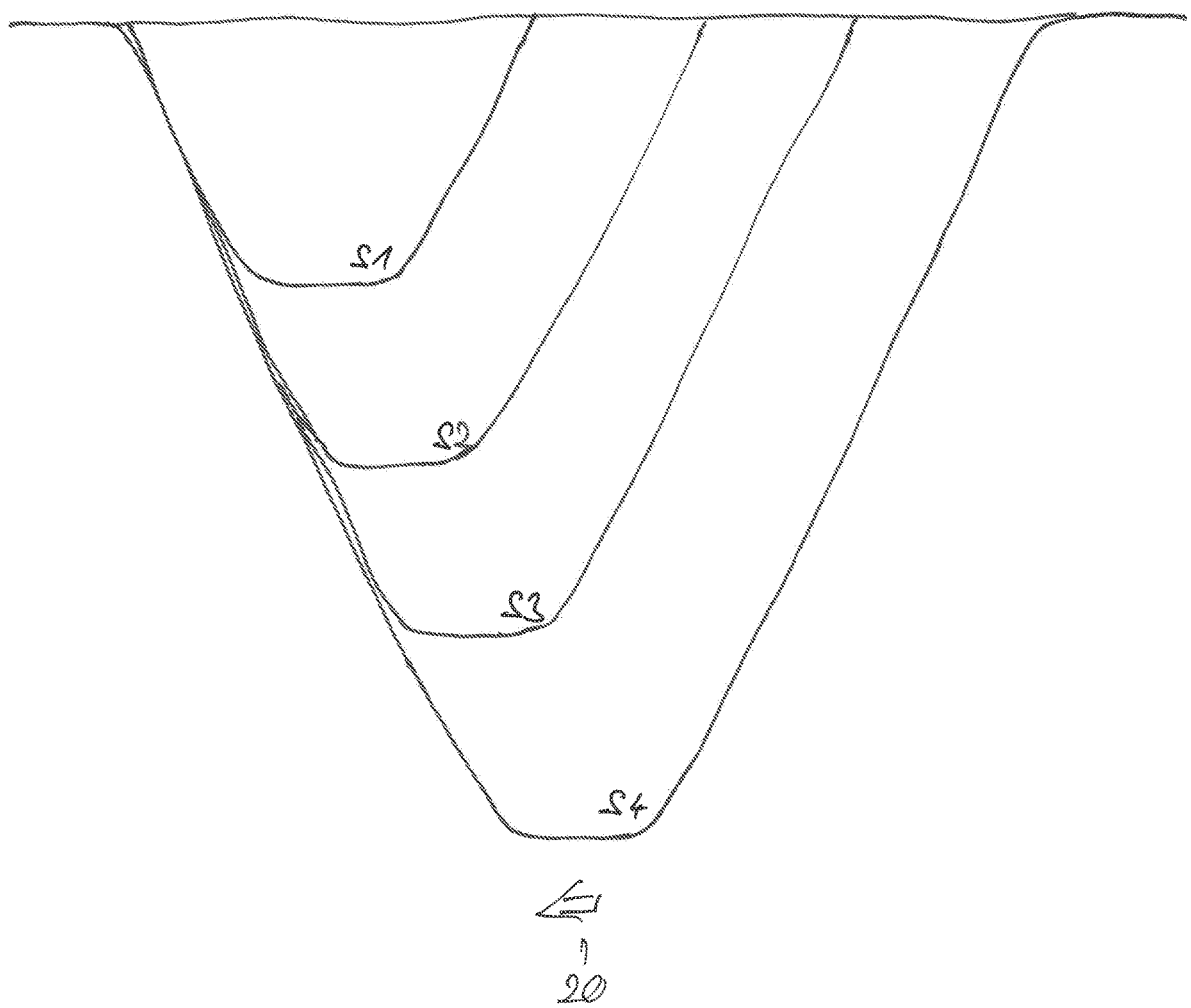
FIG. 1 shows the machining steps of a first method according to the prior art.
Figure 2:
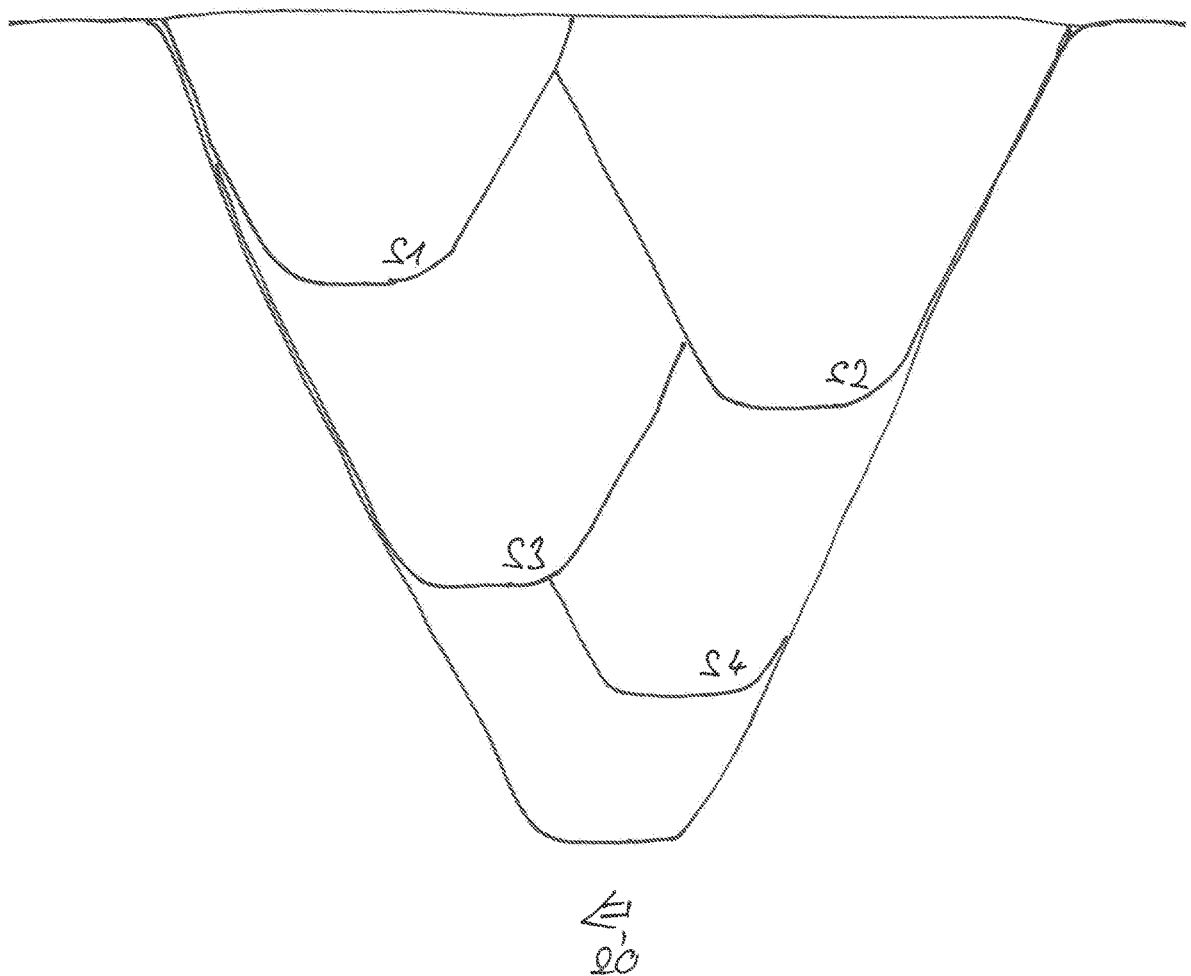
FIG. 2 shows the machining steps of a second method according to the prior art.
Figure 3:
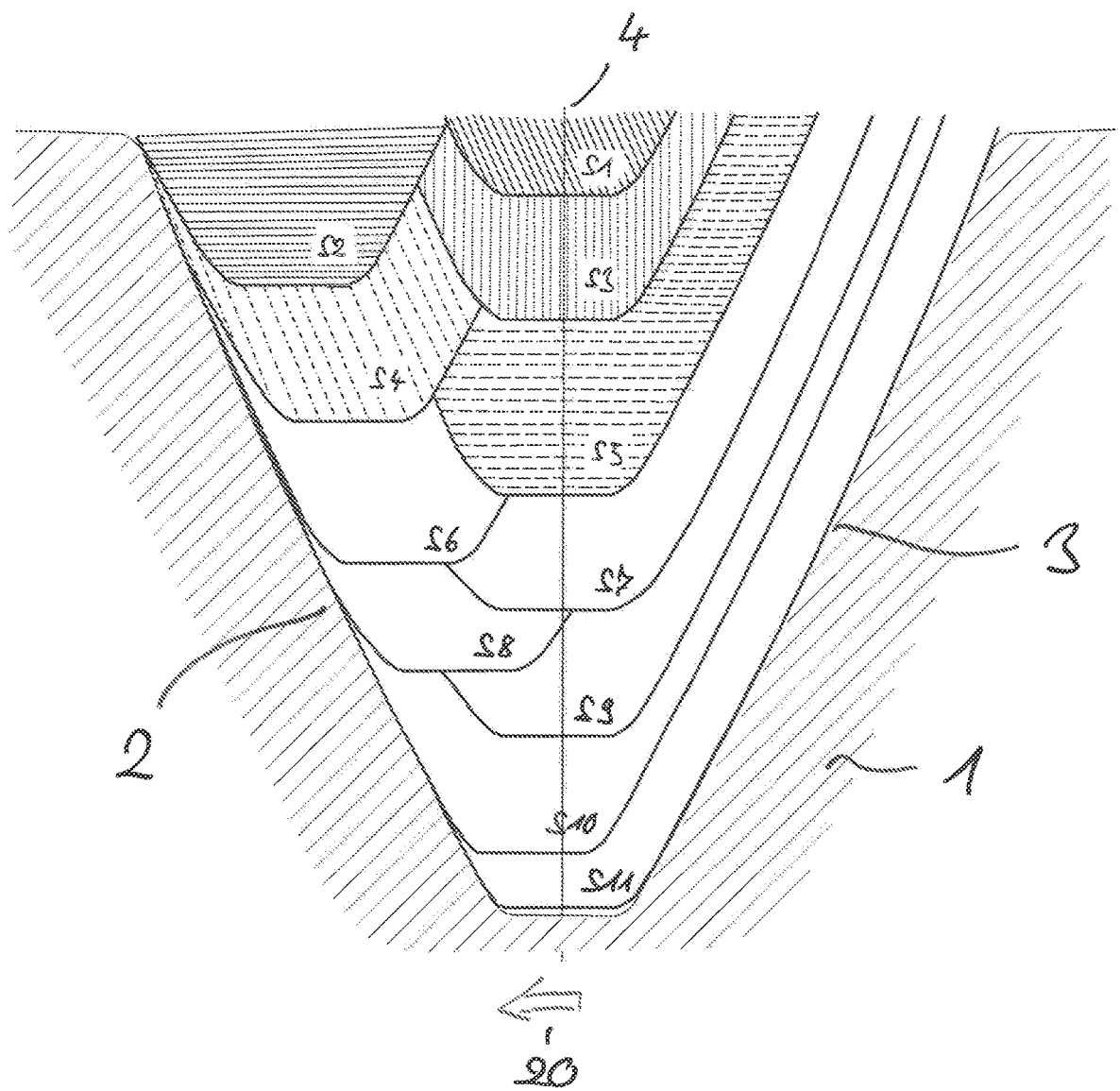
FIG. 3 shows the machining steps of a first embodiment of a method according to the present disclosure.
Figure 4:
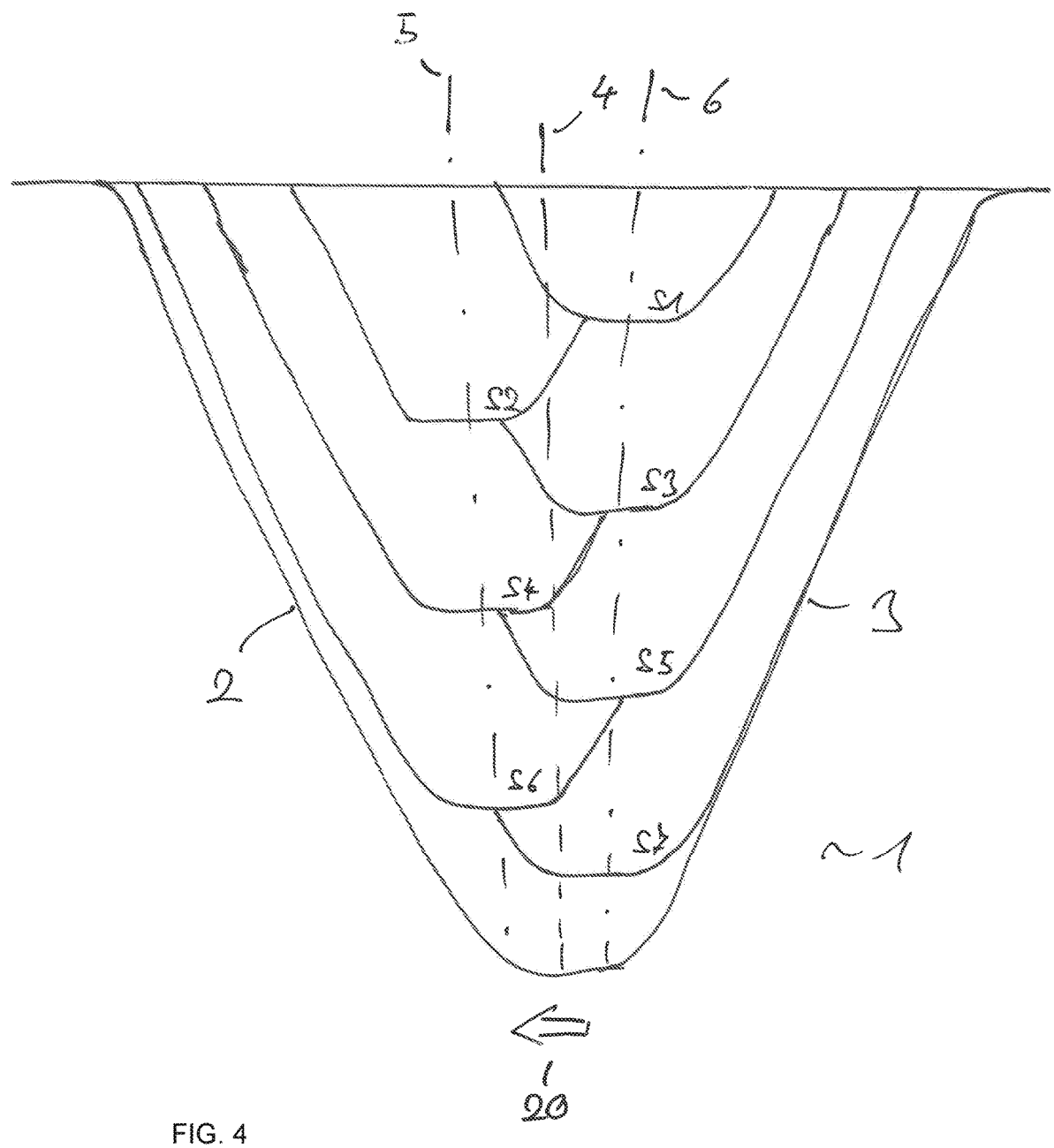
FIG. 4 shows the machining steps of a second embodiment of a method according to the present disclosure.

FIGS. 3 and 4 show the machining steps S1, S2, . . . in the case of two embodiments of the present disclosure. It is noted that instructions for carrying out the machining steps disclosed herein and herein may be executed by a controller, such as control unit 20, based on instructions stored on a memory of the controller. The instructions may be in the form of software, in at least one example. The controller may employ actuators of a gear manufacturing machine, such as gear manufacturing machine 10, to carry out one of more of the machining steps described below.

A tooth gap of a workpiece 1 with an incoming flank 2 and an outgoing flank 3 of the target toothing of the workpiece as well as the contours of the flank cuts generated by the individual machining steps are here shown. The direction in which the workpiece rotates is here provided with reference numeral 20 and runs from the right to the left in the drawing.

Machining of the workpiece 1 is executed by means of a tool, not shown, which is provided with cutting teeth and which rolls on the workpiece in generating coupling therewith and, in so doing, machines the workpiece in a chip-removing manner. The workpiece may be a gear with spur toothing. The tool used may be a skiving wheel. During the machining process, a cutting tooth of the tool moves into the tooth gap on the incoming flank 2 and then out of tooth gap on the outgoing flank 3.

Both embodiments have in common that, by suitably changing for each machining step a rotational angle superimposed on the generating coupling between the tool and the workpiece, a contour is cut that is arranged alternately closer to the incoming flank 2 and closer to the outgoing flank 3.

Furthermore, both embodiments have in common that at least for the machining steps which are arranged closer to the second flank, here the outgoing flank 3, the same rotational angle is used.

In the case of the first method shown in FIG. 3, every second machining step S1, S3, S5, S7, S9, S11 . . . has a rotational angle of zero, and is therefore set symmetrically with the target geometry of the tooth gap or symmetrically with the center axis 4 of the tooth gap. Therefore, long chips, which extend over the entire height of the tooth gap, are generated on the side of the outgoing flank.

The other half of the machining steps S2, S4, S6, S8, S10 . . . however, is set with a decreasing rotational angle such that the individual flank cuts generated by the machining steps follow one another along the target contour of the incoming flank 2. This means that only short chips are generated on the side of the incoming flank, since the tool causes only in the area of its tip a removal of material that is worth mentioning, while along its flank it abuts on the flank already produced.

In the first embodiment, only the machining steps S2, S4, S6, . . . are quality-creating, so that the machining steps S1, S3, S5, . . . can be optimized with regard to machining efficiency and/or wear. In particular, the center feed, the axial feed and the cutting speed between the individual steps may here be changed.

In the second embodiment shown in FIG. 4, the machining steps S1, S3, S5, . . . , which generate a contour that is closer to the outgoing flank 3, as well as the machining steps S2, S4, S6, . . . , which alternate therewith and generate a contour that is closer to the incoming flank, have a rotational angle 6 and 5, respectively, that which is constant for the respective series of machining steps. In this way, long chips, which extend over the entire height of the tooth gap, are generated on both sides. The two rotational angles 6 and 5 are symmetrical with the center axis 4 of the tooth gap in the present embodiment.

In the second embodiment, only the last, or the last two machining steps are quality-creating, so that all the preceding machining steps can be optimized with respect to machining efficiency and/or wear.

Figure 5:
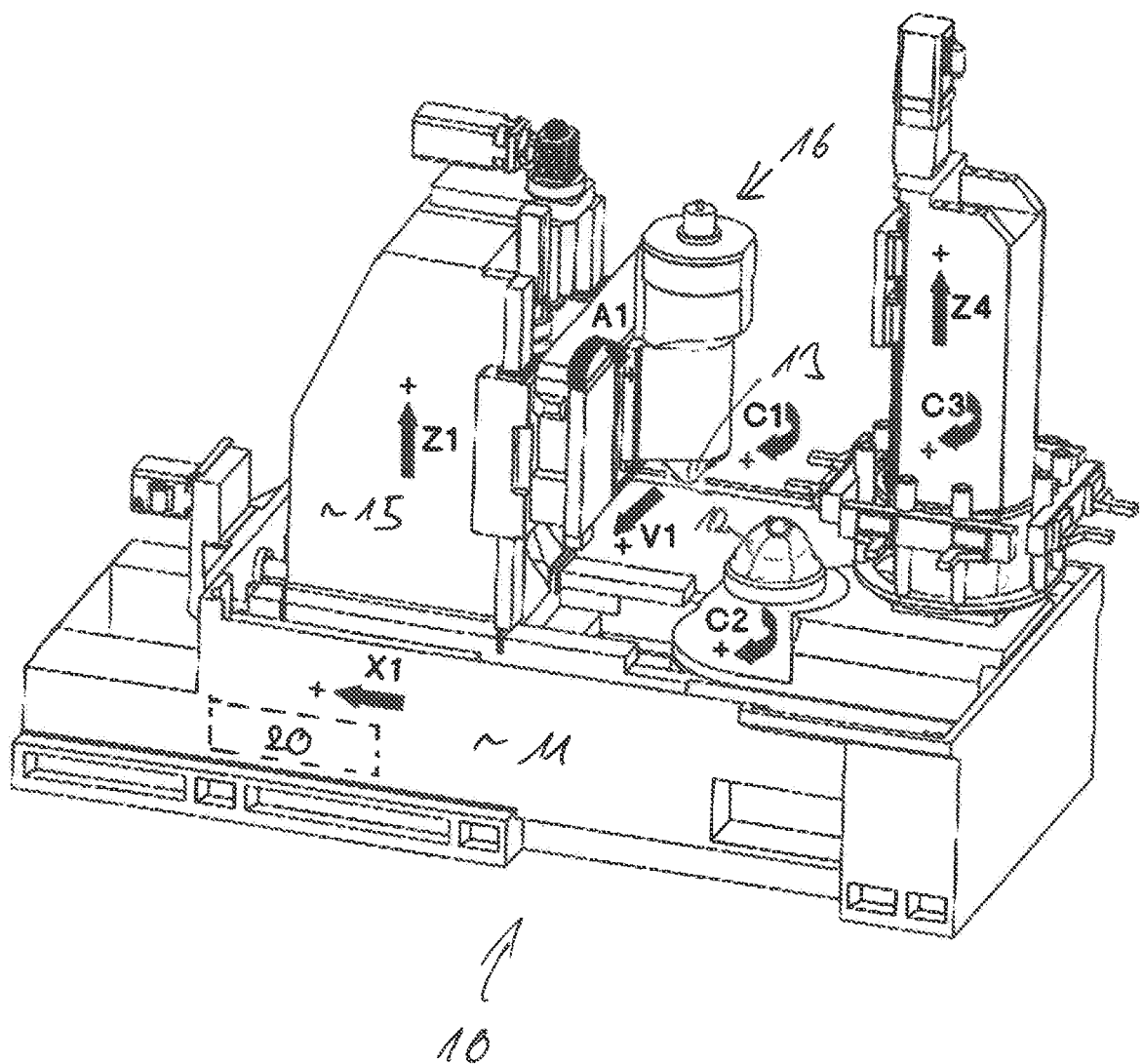
FIG. 5 shows an embodiment of a gear manufacturing machine according to the present disclosure.

FIG. 5 now shows a perspective view of an embodiment of a gear manufacturing machine 10, which is adapted to be used for executing the method according to the present disclosure and comprises, for this purpose, a suitably programmed control unit 20. As mentioned above, the control unit may include instructions stored in non-transitory memory for actuating one or more actuators of the gear manufacturing machine 10 to carry out one or more of the machining steps disclosed herein. Such actuators of the gear manufacturing machine 10 may include one or more of the machining head 16, tool holder 13 (and thus the tool clamped in the tool holder 13), workpiece holder 12, and the counter holder. The tool held by the tool holder 13 may be a skiving tool in at least one example, such as skiving tool 14. The skiving tool 14 may be a skiving wheel, for example.

The gear manufacturing machine 10 comprises a machining head 16 shown on the left with a tool holder 13 and a workpiece holder 12 shown in the middle. For executing a gear manufacturing machining operation, a workpiece clamped in the workpiece holder 12 can be machined by a tool clamped in the tool holder 13. On the right, the counterholder stand with a ring loader is shown.

In the present embodiment, the gear manufacturing machine has motion axes A1, C1, V1, X1, Z1 for moving the tool holder 13 and C2 for moving the workpiece holder 12.

The counterholder stand has a linear axis Z4 for the counterholder arm, not shown, and the rotary axis C3 of the ring loader.

In detail, the rotary axis C1 of the tool holder allows a rotation of the tool and the rotary axis C2 of the workpiece holder allows a rotational movement of the workpiece in generating coupling therewith.

The linear axis X1 allows a translational movement of the tool perpendicular to the rotary axis of the tool and of the workpiece, and thus a change of the center distance, i.e. a center feed of the tool to the workpiece.

The linear axis Z1 allows a translational movement of the tool in a vertical direction or parallel to the rotary axis of the workpiece, and thus a movement of the tool in the width direction of the workpiece.

The pivot axis A1 allows a pivoting movement of the tool and thus the adjustment of the axis intersection angle.

The linear axis V1 allows a displacement movement of the tool in a direction perpendicular to the X1 axis and the Z1 axis. For this purpose, the V1 axis may be arranged between the Z1 axis and the A1 axis.

In the present embodiment, the machining head with the axes C1 and A1 is arranged via two slides, which provide the axis V1 and the axis Z1, on a tool stand 15, which, in turn, is arranged via the axis X1 on a table 11 carrying the workpiece holder 12.

However, the gear manufacturing machine according to the present disclosure may also have a different configuration of axes.

Figure 6:
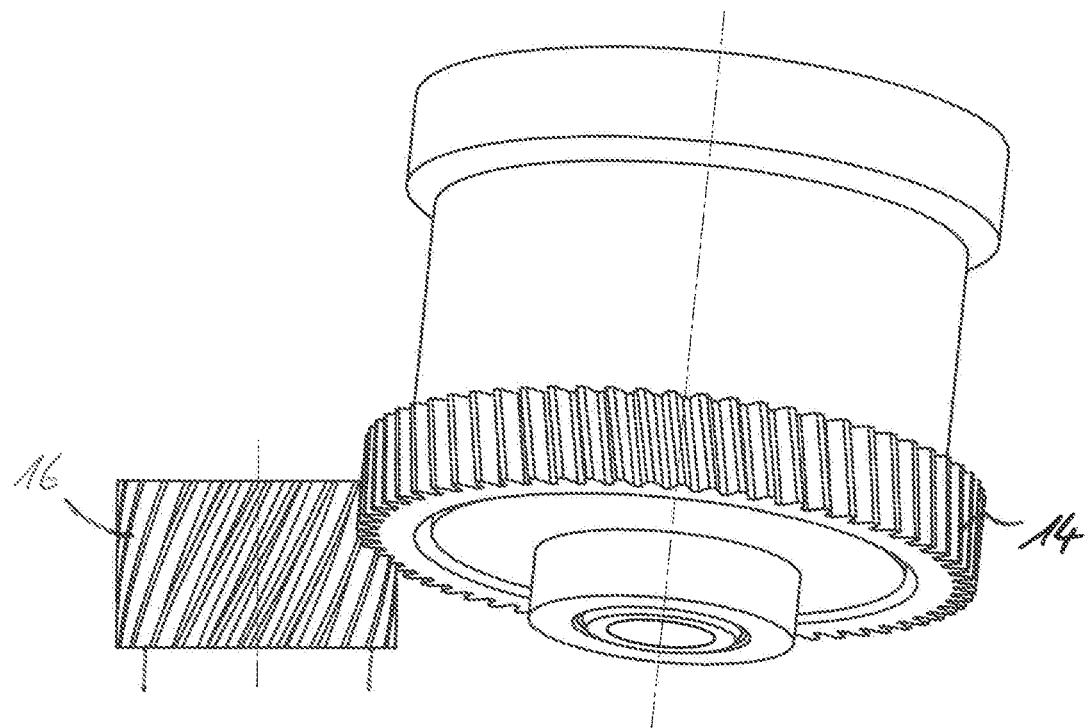
FIG. 6 shows a tool and a workpiece, which execute a method according to the present disclosure.

FIG. 6 now shows a skiving tool 14, in particular a skiving wheel, which, according to the present disclosure, is in mesh with a toothing of the workpiece 16 to be subjected to gear manufacturing machining and machines the same in a chip-removing manner in generating coupling therewith.

In each machining step, the tool 14 is guided along the workpiece 16 in the axial direction thereof and produces thereon a contour in a chip-removing manner, the contour being predetermined by the center distance and the rotational angle. Between two such machining steps, the center distance and/or the rotational angle is/are changed within the framework of the present disclosure, so as to generate in the next machining step a correspondingly shifted contour.

The method according to the present disclosure can be used both for the manufacture of externally toothed workpieces and for the manufacture of internally toothed workpieces. The workpieces may be gears with a spur gear toothing. The toothed workpieces are preferably cut from a blank by the method according to the present disclosure. Note that the example control and estimation routines included herein can be used with various manufacturing machine configurations, such as the gear manufacturing machine shown at FIG. 5. The control methods and routines disclosed herein may be stored as executable instructions in non-transitory memory and may be carried out by the control system including the controller in combination with the various sensors, actuators, and other manufacturing machine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the manufacturing machine control unit, where the described actions are carried out by executing the instructions in a system including the various manufacturing machine hardware components in combination with the electronic controller.

The invention claimed is:

1. A method for chip-removing gear manufacturing machining of a workpiece by means of a tool, comprising:
   rotating a tool, where the rotation of the tool takes place in a generating coupling with a rotation of the workpiece,
   wherein the gear manufacturing machining is carried out in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece, and
   wherein, for a plurality of machining steps which take place closer to the second flank, the tool machines the workpiece in a chip-removing manner over an entire tooth height that has already been generated in a previous machining step.

2. The method according to claim 1, wherein the second flank is an outgoing flank of the toothing.

3. The method according to claim 1, wherein a rotational angle of zero is used for the plurality of machining steps taking place closer to the second tooth flank.

4. The method according to claim 1, wherein for a plurality of machining steps taking place closer to a first tooth flank, the rotational angle is reduced step by step in such a way that flank cuts generated on the first tooth flank are connected to one another and/or follow the contour of the target toothing of the workpiece, and/or the tool machines the workpiece in a chip-removing manner on this tooth flank only over a lower part of a tooth height that has already been generated.

5. The method according to claim 4, wherein the first tooth flank is an incoming tooth flank.

6. The method according to claim 1, wherein, for a plurality of machining steps which take place closer to the first tooth flank, the same rotational angle is used and/or wherein the tool machines the workpiece in a chip-removing manner in a plurality of machining steps on a side of an incoming flank as well as on a side of an outgoing flank over an entire tooth height.

7. The method according to claim 6, wherein an absolute value of the rotational angle is selected to be the same for the plurality of machining steps and a sign of the rotational angle changes depending on whether a cut generated runs closer to the first tooth flank or the second tooth flank.

8. The method according to claim 1, wherein an axial feed and/or a cutting speed and/or the change of a center feed between two machining steps varies for at least two machining steps.

9. The method according to claim 8, wherein the axial feed and/or the center feed and/or the cutting speed selected for a machining step taking place closer to the second flank exceeds that/exceeds those selected for a preceding and/or a subsequent machining step taking place closer to the first flank.

10. The method according to claim 1, wherein the rotation of the tool taking place in the generating coupling with the rotation of the workpiece is during gear manufacturing machining of the workpiece by skiving.

11. A computer-readable medium storing instructions that, when executed by a computer cause a gear manufacturing machine to perform a generating machine program, which implements a method according to claim 1.

12. The computer-readable medium according to claim 11, wherein the generating machine program is a skiving program.

13. The method according to claim 1, wherein the same rotational angle is used for the plurality of machining steps taking place closer to the second flank.

14. The method according to claim 1, wherein at least two successive machining steps are executed with similar cutting edge loads.

15. The method according to claim 1, wherein a first cutting edge of the tool used for machining the first flank of the workpiece is subject to similar wear as a second cutting edge of the tool used for machining the second flank of the workpiece.

16. The method of claim 1, wherein the plurality of machining steps are neither the first machining step nor the final machining step.

17. The method of claim 1, wherein at least two consecutive machining steps of the plurality of machining steps which take place closer to the second flank machine the workpiece in the chip-removing manner over the entire tooth height that has already been generated.

18. A gear manufacturing machine, comprising:
a tool holder rotatable about a first rotary axis,
a workpiece holder rotatable about a second rotary axis,
at least one further motion axis by means of which a center distance between the tool holder and the workpiece holder are adjustable, and
a control unit for controlling the rotary axes and/or the motion axis,
wherein the control unit comprises a generating machining program by means of which a tool held in the tool holder machines, in a chip-removing manner, a workpiece held in the workpiece holder, in a generating coupling therewith,
wherein the generating machining program comprises instructions for carrying out a method on the gear manufacturing machine,
wherein the method comprises, rotating the tool, where the rotation of the tool takes place in a generating coupling with a rotation of the workpiece,
wherein the gear manufacturing machining is carried out in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece, and
wherein, for a plurality of machining steps which take place closer to the second flank, the tool machines the workpiece in a chip-removing manner over an entire tooth height that has already been generated in a previous machining step.

19. The gear manufacturing machine according to claim 18, wherein the generating machining program is a skiving program.

20. The gear manufacturing machine according to claim 18, wherein the workpiece is machined by skiving.

21. A method for chip-removing gear manufacturing machining of a workpiece by means of a tool, comprising:
rotating a tool, where the rotation of the tool takes place in a generating coupling with a rotation of the workpiece,
wherein the gear manufacturing machining is carried out in a plurality of machining steps, wherein the center distance and/or a rotational angle between the workpiece and the tool superimposed on the generating coupling is/are changed between two machining steps, so that the tool will cut in the machining steps a respective contour that extends alternately closer to a first and a second flank of the target toothing of the workpiece, and
wherein, for a plurality of machining steps which take place closer to the second flank, the tool machines the workpiece in a chip-removing manner over an entire tooth height that has already been generated, the first and the second flank machined in at least one further final machining step.

* * * * *